March 10, 1936.  H. E. MUENCH  2,033,391

BORDER SHADE FOR REAR VIEW MIRRORS

Filed April 4, 1935

Inventor
Herbert E. Muench
by Rippey & Cassidy
His Attorneys

Patented Mar. 10, 1936

2,033,391

UNITED STATES PATENT OFFICE 2,033,391

BORDER SHADE FOR REAR VIEW MIRRORS

Herbert E. Muench, University City, Mo.

Application April 4, 1935, Serial No. 14,624

5 Claims. (Cl. 88—77)

This invention relates to a border shade for rear view mirrors for vehicles.

An object of this invention is to provide a device which will screen light rays about the edge of a rear view mirror and which will frame such a mirror in such a manner as to enhance the view obtained through it.

Another object of the invention is to provide means simple in construction and economical to manufacture, for attaching such a shield to a rear view mirror.

Other and specific objects will be apparent from the following detail description, taken in connection with the accompanying drawing.

Figure 1:
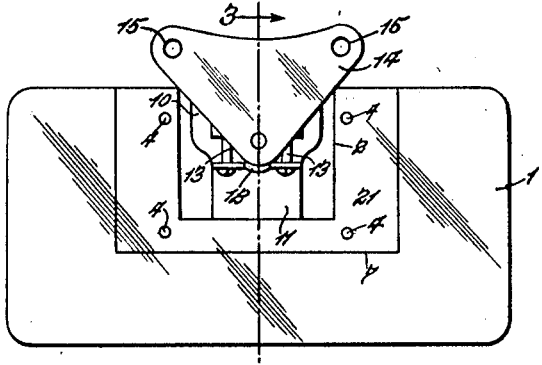
Fig. 1 is a plan view taken from the rear of such a border shade attached to and with a mirror.

The device includes a sheet of material 1 which is opaque, semi-transparent, or transparent and colored, to block or screen glaring light rays. As specifically illustrated in the drawing, the sheet is transparent, as indicated in Fig. 1, and is preferably green or amber celluloid. The sheet 1 is cut-out centrally and adjacent its upper edge, providing an internal edge 2, thus enabling the device to be assembled on the mirror about a support or bracket for the mirror.

Figure 2:
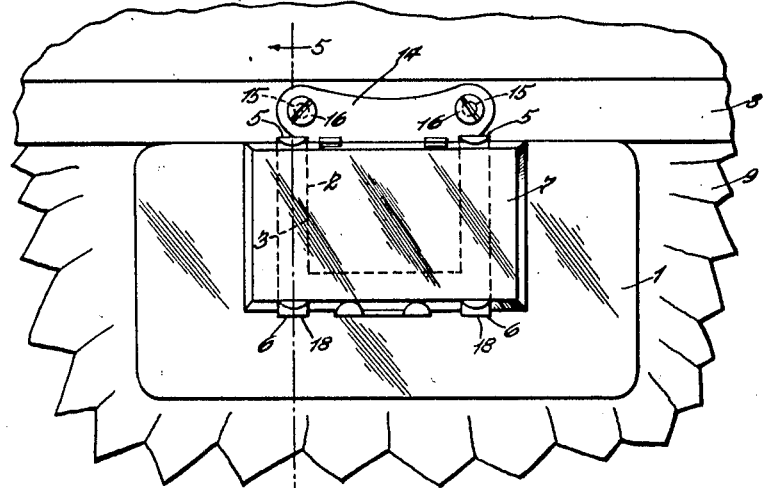
Fig. 2 is an elevation of the device in combination with a mirror which is attached to the frame of a windshield for which it is adapted.
Figure 3:
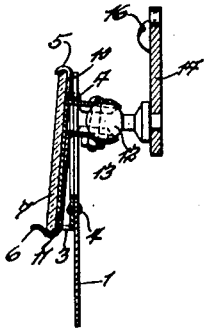
Fig. 3 is a section on line 3—3, Fig. 1.
Figure 5:
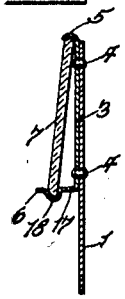
Fig. 5 is a section on line 5—5, Fig. 2.
Figure 4:
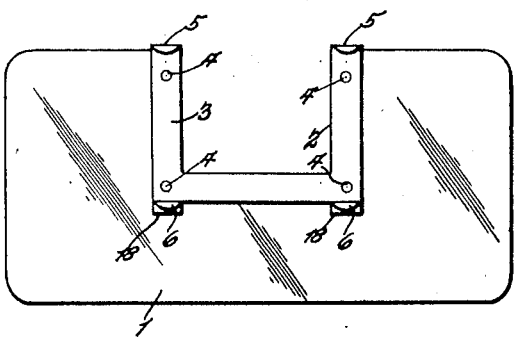
Fig. 4 is a plan view from the front of a detached device embodying this invention.

An attaching member or yoke 3 of resilient sheet metal, preferably bronze, is secured by rivets 4 adjacent the internal edge 2, and has integral hooks or clips 5 at its outer ends and clips 6 on its inner side to engage the upper and lower edges respectively of the mirror, as clearly shown in Figs. 2, 3 and 5.

The mirror per se is no part of this invention and that specifically illustrated and here described is merely illustrative of one embodiment with which the device of this invention may be used. It comprises a glass mirror 7 rectangular in shape with a swivel bracket by which it may be attached to a frame 8, which borders a windshield 9. The bracket includes a pair of clamping members 10 and 11 which engage the glass and terminate in concave portions to accommodate a spherical or ball member 12. The members 10 and 11 are held together by bolts 13. The ball 12 is supported by a plate 14 which has holes 15 to accommodate screws 16, by which the plate may be secured to the windshield frame 8.

To provide room for the member 11 of the mirror bracket, without flexing the sheet 1 or the yoke 3, the lower clips 6 are preferably formed as best shown in Fig. 5, to include a straight portion 17 and a concave portion 18. This places the glass far enough in front of the sheet 1 to allow room for the member 11 between the glass and the central portion of the yoke 3.

The utility of the device will be apparent from the foregoing description. When a driver of a vehicle equipped with such a border shield looks toward the mirror his eyes are screened from direct rays which may be coming through the windshield adjacent the mirror. Being of contrasting color or light reflection, the device serves to emphasize the view obtained through the mirror, separately and in addition to the function of screening direct rays.

The device is so constructed that it may be readily attached to or detached from the mirror. This is accomplished by hooking the clips 5 over the top edge of the mirror and then pressing forwardly until the glass is seated in the concave portions 18 of the clips 6.

Various changes may be made in the details of construction, within the scope of the appended claims, without departing from the spirit of this invention.

I claim:

1. The combination with a rear view mirror, of a sheet of ray-blocking material positioned at the back of the mirror, extending for a substantial distance beyond the side and bottom edges of the mirror and having a central opening cut therein to accommodate a bracket for the mirror, and means for attaching said sheet to the mirror.

2. A border shade for a rear view mirror including a rectangular sheet of ray-blocking material having an opening cut adjacent its upper edge to accommodate a bracket for the mirror, a metallic member adjacent the edge of said opening and secured to the sheet and clamping members on the metallic member for engagement with the mirror.

3. A border shade for a rear view mirror comprising a sheet of ray-blocking material adapted to be placed at the back of the mirror, extended for a substantial distance beyond the side and bottom edges thereof, and having centrally a cut out portion adjacent its upper edge, a metallic yoke secured to said sheet and extending about said cut out portion, hook members integral with the upper part of the yoke and adapted to engage the top edge of the mirror, and resilient clamps at the lower edge of the yoke member and adapted to engage the lower edge of the mirror.

4. A border shade for a rear view mirror including a sheet of ray-blocking material comprising colored celluloid adapted when in place to extend a substantial distance beyond the side and bottom edges of the mirror and having a cut out portion to accommodate a bracket for the mirror, a yoke member secured to the sheet, hook members at the top of the yoke adapted to engage the upper edge of the mirror, and a clamping member at the lower end of the yoke adapted to engage the lower edge of the mirror.

5. A border shade for a rear view mirror including a sheet of ray-blocking material adapted to be placed at the rear of the mirror and having a cut out portion to accommodate a bracket for the mirror, and fastening devices secured to the sheet and adapted to engage the edges of the mirror to support the shade.

HERBERT E. MUENCH.